US009326104B2

(12) United States Patent
Chen et al.

(10) Patent No.: US 9,326,104 B2
(45) Date of Patent: Apr. 26, 2016

(54) METHOD AND APPARATUS FOR INDOOR/OUTDOOR DETECTION USING AMBIENT SIGNALS

(71) Applicant: QUALCOMM Incorporated, San Diego, CA (US)

(72) Inventors: Yin Chen, Campbell, CA (US); Ayman Fawzy Naguib, Cupertino, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/284,754

(22) Filed: May 22, 2014

(65) Prior Publication Data
US 2015/0341753 A1    Nov. 26, 2015

(51) Int. Cl.
*H04W 4/04* (2009.01)
*H04W 4/06* (2009.01)
*H04B 17/00* (2015.01)
(Continued)

(52) U.S. Cl.
CPC ............. *H04W 4/04* (2013.01); *G01S 5/0252* (2013.01); *G01S 19/48* (2013.01); *H04B 17/0057* (2013.01); *H04W 4/043* (2013.01); *H04W 4/06* (2013.01)

(58) Field of Classification Search
CPC ....... H04W 64/00; H04W 88/06; H04W 4/02; H04W 4/008; H04W 4/043; H04W 36/0066; H04W 84/045; H04W 84/12; H04W 48/04; H04W 4/025; H04W 52/0251; H04W 67/16; H04W 1/0026; G01S 5/0252; G01S 5/14; G01S 19/39; G01S 19/42; G01S 5/0257; G01S 5/0263; G01S 5/06; H01Q 1/1257
See application file for complete search history.

(56) References Cited

U.S. PATENT DOCUMENTS 5,936,572 A    8/1999    Loomis et al.
6,806,830 B2   10/2004   Panasik et al.
(Continued)

FOREIGN PATENT DOCUMENTS

EP    2200352 A1    6/2010
EP    2046087 B1    8/2011
(Continued)

OTHER PUBLICATIONS

International Search Report and Written Opinion—PCT/US2015/028131—ISA/EPO—Jul. 23, 2015.
(Continued)

*Primary Examiner* — Nizar Sivji
(74) *Attorney, Agent, or Firm* — Hunter Clark PLLC

(57) ABSTRACT

Systems and methods for determining whether a mobile device is indoors or outdoors based on ambient signal measurements are described herein. A method for performing indoor/outdoor detection for a mobile device as described herein includes identifying one or more selected radio channels, including at least one of amplitude modulation (AM) radio stations, frequency modulation (FM) radio stations, or television stations, in an area of the mobile device; obtaining information relating to reference outdoor signal strengths for the respective selected radio channels; calculating measured signal strengths for signals received via the selected radio channels; comparing the reference outdoor signal strengths and the measured signal strengths; and classifying the mobile device as indoors or outdoors based on a result of the comparison.

27 Claims, 12 Drawing Sheets

(51) Int. Cl.
*G01S 19/48* (2010.01)
*G01S 5/02* (2010.01)

(56) References Cited

U.S. PATENT DOCUMENTS

| | | | | |
|---|---|---|---|---|
| 2003/0145328 A1* | 7/2003 | Rabinowitz | G01S 5/0036 | 725/72 |
| 2007/0049295 A1* | 3/2007 | Soliman | G01S 5/0252 | 455/456.3 |
| 2010/0311415 A1* | 12/2010 | Hamabe | H04W 24/02 | 455/425 |
| 2011/0156952 A1 | 6/2011 | Bhattacharya et al. | | |
| 2012/0169535 A1 | 7/2012 | Kong et al. | | |

FOREIGN PATENT DOCUMENTS

| | | |
|---|---|---|
| EP | 2312331 B1 | 5/2013 |
| WO | 2012094501 A1 | 7/2012 |

OTHER PUBLICATIONS

Li M., et al., "IODetector: A Generic Service for Indoor Outdoor Detection", ACM Transactions on Sensor Networks, Nov. 9, 2012, pp. 1-14, XP055202586, Toronto DOI: 10.1145/2659466 Retrieved from the Internet: URL: http://www3.ntu.edu.sg/home/limo/papers/SenSys12_IODetector.pdf [retrieved-on Jul. 15, 2015] the whole document.

* cited by examiner

METHOD AND APPARATUS FOR INDOOR/OUTDOOR DETECTION USING AMBIENT SIGNALS

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Advancements in mobile device technology have also given mobile devices the ability to detect and leverage device/user context information, such as the location of a device, events occurring in the area of the device, etc., in performing and customizing functions of the device. For instance, a mobile device may utilize various techniques to determining whether the device is presently indoors or outdoors. The process of determining whether a mobile device is indoors or outdoors is referred to herein as "indoor/outdoor detection." Indoor/outdoor detection performed with respect to a mobile device provides general awareness of the indoor/outdoor context to the device, which in turn can enable the device to perform actions such as selectively activating indoor or outdoor positioning services as needed to reduce power usage and/or improve overall user experience.

Various techniques for indoor/outdoor detection utilize WiFi-based solutions, in which the indoor/outdoor status of a mobile device is estimated based at least in part on the presence or absence of detectable WiFi signals from one or more WiFi access points (APs) near the position of the device. However, in WiFi-based solutions, the absence of a detectable AP near the device signifies only that the device is at least a certain distance away from any APs. Based on the absence of detectable WiFi signals alone, a conclusion cannot be drawn as to whether the device is indoors or outdoors.

SUMMARY

An example of a method for performing indoor/outdoor detection for a mobile device as described herein includes identifying one or more selected radio channels, including at least one of amplitude modulation (AM) radio stations, frequency modulation (FM) radio stations, or television stations, in an area of the mobile device; obtaining information relating to reference outdoor signal strengths for the respective selected radio channels; measuring signal strengths for signals received via the selected radio channels; comparing the reference outdoor signal strengths and the measured signal strengths; and classifying the mobile device as indoors or outdoors based on a result of the comparison.

An example of a mobile device as described herein is operable in a wireless communication system and includes a radio frequency (RF) signal information module configured to identify one or more selected radio channels, including at least one of AM radio stations, FM radio stations, or television stations, in an area of the mobile device, and to obtain information relating to reference outdoor signal strengths for the respective selected radio channels; a transceiver configured to receive wireless signals; a radio tuner communicatively coupled to the transceiver and the RF signal information module and configured to identify, from the wireless signals received by the transceiver, signals received via the selected radio channels and to measure signal strengths for the received signals; and an indoor/outdoor detection module communicatively coupled to the RF signal information module and the radio tuner and configured to compare the reference outdoor signal strengths and the measured signal strengths and to classify the mobile device as indoors or outdoors based on a result of the comparison.

An example of an apparatus for performing indoor/outdoor detection as described herein includes a transceiver configured to receive wireless signals, a memory storing instructions, and at least one processor communicatively coupled to the transceiver and the memory and configured to execute the instructions stored by the memory. The instructions, when executed by the processor, cause the processor to identify one or more selected radio channels, including at least one of AM radio stations, FM radio stations, or television stations, in an area of the apparatus; obtain information relating to reference outdoor signal strengths for the respective selected radio channels; identify, from the wireless signals received by the transceiver, signals received via the selected radio channels; measure signal strengths for the received signals; and classify the apparatus as indoors or outdoors at least in part by comparing the reference outdoor signal strengths and the measured signal strengths.

An example of a non-transitory processor-readable storage medium as described herein includes processor-executable instructions configured to cause a processor to identify one or more selected radio channels, including at least one of AM radio stations, FM radio stations, or television stations, in an area of a mobile device; obtain information relating to reference outdoor signal strengths for the respective selected radio channels; measure signal strengths for the received signals; and classify the mobile device as indoors or outdoors based at least on part on a comparison of the reference outdoor signal strengths and the measured signal strengths.

Items and/or techniques described herein may provide one or more of the following capabilities, as well as other capabilities not mentioned. The techniques for indoor/outdoor detection described herein can be implemented by any device with radio tuner capability, which increases the amount of devices at which indoor/outdoor detection can be performed by reducing reliance on specific, dedicated positioning mechanisms. Indoor/outdoor detection techniques based on broadcast radio signals as described herein can also be used in a wide variety of locations since such signals are widely available and exhibit relatively higher penetration than other types of ambient signals. Additionally, circuitry and/or other components used for receiving and decoding broadcast radio signals generally operate at a lower power level than similar components utilized for Wi-Fi signals, thereby reducing power usage relating to processing detected signals. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect.

DETAILED DESCRIPTION

Described herein are systems and methods for using radio broadcast signals (e.g., AM/FM radio and/or television broadcast signals) and/or other ambient signals to determine whether a mobile device is located indoors or outdoors. More particularly, the attenuation properties of radio broadcast signals are leveraged to perform indoor/outdoor detection at a mobile device based on a comparison of received signal strengths to expected or reference signal strengths. Additional classifications and/or data, such as ambient audio or orientation sensor measurements, may also be used as further described herein.

Figure 1:
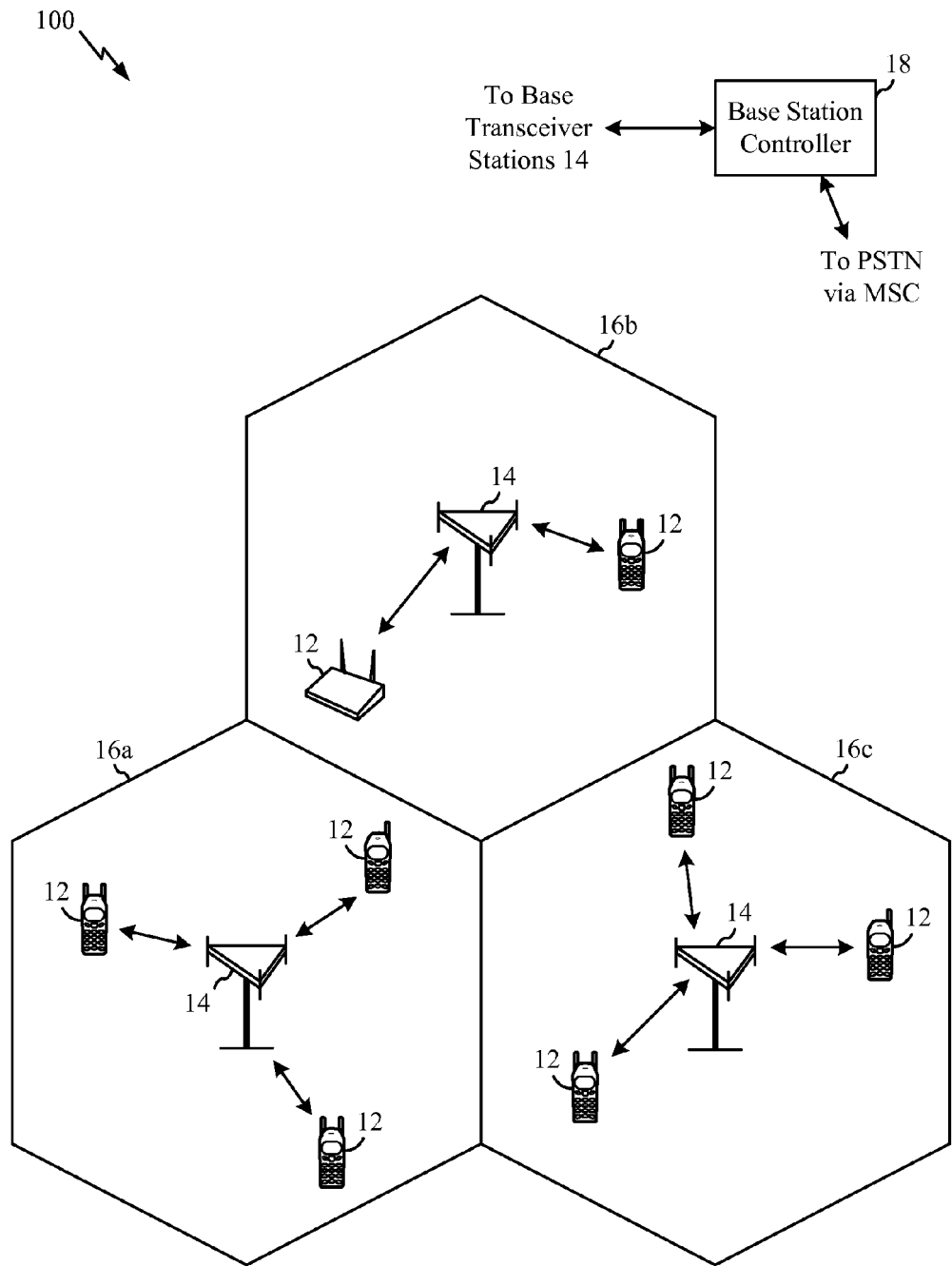
FIG. 1 is a schematic diagram of a wireless telecommunication system.

Referring to FIG. 1, a wireless communication system 100 includes mobile devices 12, base stations 14 disposed in cells 16, and a base station controller (BSC) 18. The system 10 may support operation on multiple carriers (waveform signals of different frequencies). The system 100 is a communication system in that the system 100 can at least send or receive communications although it need not be, but preferably is, able to send and receive communications. Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc.

The base stations 14 can wirelessly communicate with the mobile devices 12 via antennas. Each of the base stations 14 may also be referred to as a base transceiver station (BTS), an access point, an access node (AN), a Node B, an evolved Node B (eNB), etc. The base stations 14 are configured to communicate with the mobile devices 12 under the control of the BSC 18 via multiple carriers. Each of the base stations 14 can provide communication coverage for a respective geographic area, here the respective cells 16. Each of the cells 16 is partitioned into multiple sectors as a function of the antennas of each of the respective base stations 14.

The system 100 may include only macro base stations or it can have base stations of different types, e.g., macro, pico, and/or femto base stations. A macro base station may cover a relatively large geographic area (e.g., several kilometers in radius) and may allow unrestricted access by terminals with a service subscription. A pico base station may cover a relatively small geographic area (e.g., a pico cell) and may allow unrestricted access by terminals with a service subscription. A femto or home base station may cover a relatively small geographic area (e.g., a femto cell) and may allow restricted access by terminals having association with the femto cell (e.g., terminals for users in a home).

The mobile devices 12 can be dispersed throughout the cells 16. The mobile devices 12 may be referred to as mobile stations, user equipment (UE), subscriber units, terminals or access terminals (AT), etc. The mobile devices 12 here include cellular phones and a wireless router but could also include personal digital assistants (PDAs), other handheld devices, netbooks, notebook computers, etc.

While various implementations described herein may refer to network elements and/or utilize nomenclature specific to one or more network technologies, the techniques described herein are not intended to be limited to a specific technology and may be applied to any suitable technology or combination thereof, whether presently existing or developed in the future.

Figure 2:
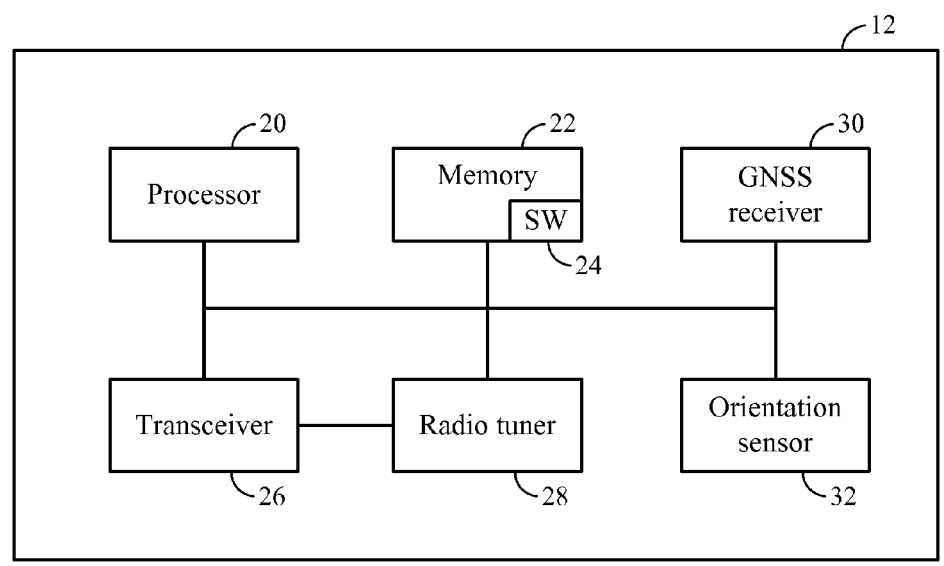
FIG. 2 is a block diagram of components of one embodiment of a mobile device shown in FIG. 1.

Referring next to FIG. 2, an example one of the mobile devices 12 comprises a computer system including a processor 20, memory 22 including software 24, and a transceiver 26 coupled to a radio tuner 28. The example mobile device 12 shown in FIG. 2 further includes a global navigation satellite system (GNSS) receiver 30 and an orientation sensor 32, although in some embodiments one or both of these components may be omitted from the mobile device 12.

The processor 20 is preferably an intelligent hardware device, e.g., a central processing unit (CPU) such as those made by ARM®, Intel® Corporation, or AMD®, a microcontroller, an application specific integrated circuit (ASIC), etc. The processor 20 could comprise multiple separate physical entities that can be distributed in the mobile device 12. The memory 22 includes random access memory (RAM) and read-only memory (ROM). The memory 22 is a non-transitory processor-readable storage medium that stores software 24 which is processor-readable, processor-executable software code containing processor-readable instructions that are configured to, when executed, cause the processor 20 to perform various functions described herein (although the description may refer only to the processor 20 performing the functions). Alternatively, the software 24 may not be directly executable by the processor 20 but configured to cause the processor 20, e.g., when compiled and executed, to perform the functions. Media that can make up the memory 22 include, but are not limited to, RAM, ROM, FLASH, disc drives, etc.

The transceiver 26 provides, via one or more antennas (not shown), bi-directional communication functionality to one or more of the base stations 14 associated with a cellular network as shown in FIG. 1, APs associated with a localized communication network, and/or other serving entities for communication systems associated with the mobile device 12. In some implementations, the transceiver 26 may support communication over a variety of communication systems, and the mobile device 12 may utilize the same antennas or different antennas for different communication systems.

The radio tuner 28 is communicatively coupled to the transceiver 26 and processes radio frequency (RF) signals received by the transceiver 26. Here, the radio tuner 28 is configured to convert information transmitted over one or more radio broadcast channels, such as AM/FM radio or over-the-air television broadcasts or the like, into a format usable by the mobile device 12. For instance, the radio tuner 28 may downconvert an RF signal from a carrier frequency on which the signal was received to a lower frequency, e.g., an intermediate frequency, utilized by other components of the mobile device 12. Additionally, the radio tuner 28 may perform filtering, demodulation, and/or other functions with respect to received RF signals. In some implementations, the radio tuner 28 is implemented as a standalone hardware element, e.g., an FM receiver chip. In other implementations, the functionality of the transceiver 26 and radio tuner 28 are combined into a single hardware element, e.g., a combination FM/Bluetooth/Wi-Fi transceiver chip or other multi-radio transceiver chips. In general, the radio tuner 28 may be a separate component of the mobile device 12 or at least partially implemented by the transceiver 26 and/or other components, such as the processor 20 via the software 24 stored on the memory 22.

Figure 3:
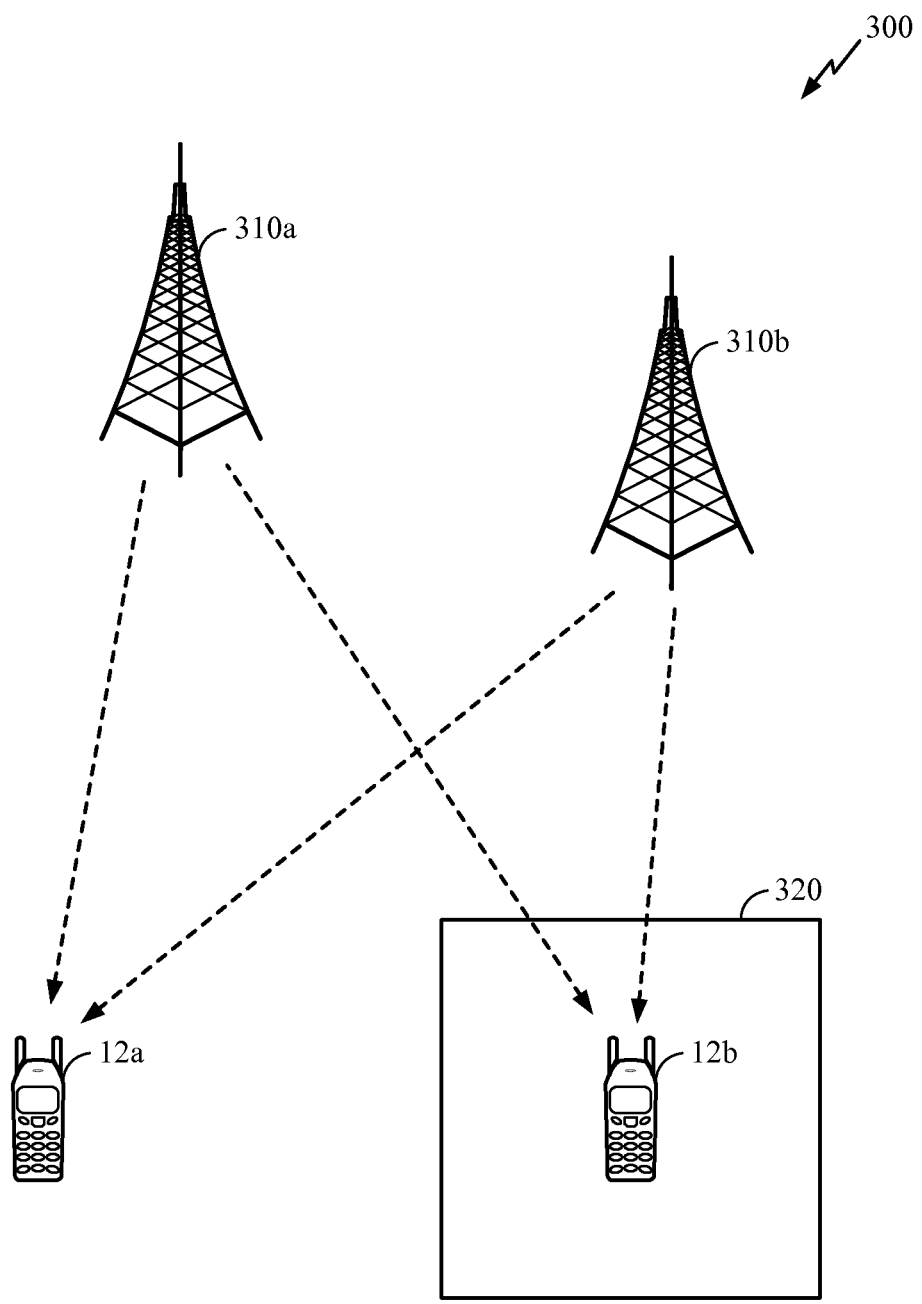
FIG. 3 is a simplified schematic diagram of a radio broadcast communication system.

The radio tuner 28 and/or equivalent mechanisms as shown above enable the mobile device 12 to receive transmissions from a radio broadcast communication system, such as system 300 shown in FIG. 3. The system 300 includes radio transmission towers (radio towers) 310, here two radio towers 310, which broadcast radio signals at one or more designated radio frequencies. Here, a "radio frequency" refers to a frequency conventionally associated with amplitude modulation (AM) and/or frequency modulation (FM) radio broadcasts or over-the-air television broadcasts, although other frequencies could be used. A radio frequency at which one of the radio towers 310 broadcasts signals is also conventionally referred to as a "station," e.g., a radio station and/or television station.

As further shown by FIG. 3, signals broadcasted by the radio towers 310 are received at one or more of the mobile devices 12, via the radio tuner 28, located in various positions within coverage areas of the radio towers 310. As different signals broadcasted by the radio towers 310 are associated with different radio frequencies, the radio tuner 28 of each of the mobile devices 12 may be configured to select a single frequency or range of radio frequencies and process only signals associated with the selected frequency. This selection may be performed manually, e.g., by a user, or by an automated process such as scanning.

The radio towers 310 broadcast signals associated with one or more stations to cover wide geographical areas. An area covered by one of the radio towers 310 is generally ten or more miles in radius, although shorter-range transmissions are possible. The actual range of a given radio transmission may depend on a range of factors such as, e.g., transmission power, signal frequency, etc. In most populated areas in North America and other regions of the world, multiple radio/television stations (including FM radio, AM radio, and television stations), herein referred to collectively as "radio channels" or simply "channels," are available at any given location. On average, at least approximately thirty radio channels are available in urban radio markets, and at least approximately ten radio channels are available in rural radio markets. Each radio channel is associated with a frequency range associated with given section of the radio spectrum. For instance, according to North American radio broadcast conventions, FM radio signals are transmitted at frequencies between 87.5-108 MHz, AM radio signals are transmitted at frequencies between 540-1600 kHz, and television signals are transmitted at frequencies between 54-806 MHz that do not fall within the FM radio frequency band. Other frequency configurations are also used, e.g., for different global regions.

Radio broadcast signals generally decay very slowly over large distances due to their structure and configuration. For instance, as noted above, a radio broadcast signal may be transmitted over a coverage area spanning tens of miles, and in some cases hundreds of miles, based on signal propagation conditions, signal frequency, transmit power, and other factors. Additionally, radio broadcast signals can penetrate walls and/or other physical barriers, which enables these signals to be received by both outdoor mobile devices, e.g., the mobile device 12a, and indoor mobile devices, e.g., the mobile device 12b located inside a structure 320 such as a building. While radio broadcast signals decay slowly over large distances, such signals are significantly attenuated by exterior walls of the structure 320 and/or other physical obstructions. For instance, exterior walls of a structure may cause attenuation of approximately 20 dB or more in some cases. Other structural elements or physical obstacles may cause similar attenuation. While a radio broadcast signal is still typically strong enough to be successfully received inside buildings such as the structure 320 within the signal's coverage area, the attenuation of the signal due to walls of the structure 320 causes a drop in received signal strength indication (RSSI), signal-to-noise ratio (SNR) and/or other signal strength measurements that is large enough to be detected by the radio tuner 28 and/or the transceiver 26 of the mobile device 12.

Figure 4:
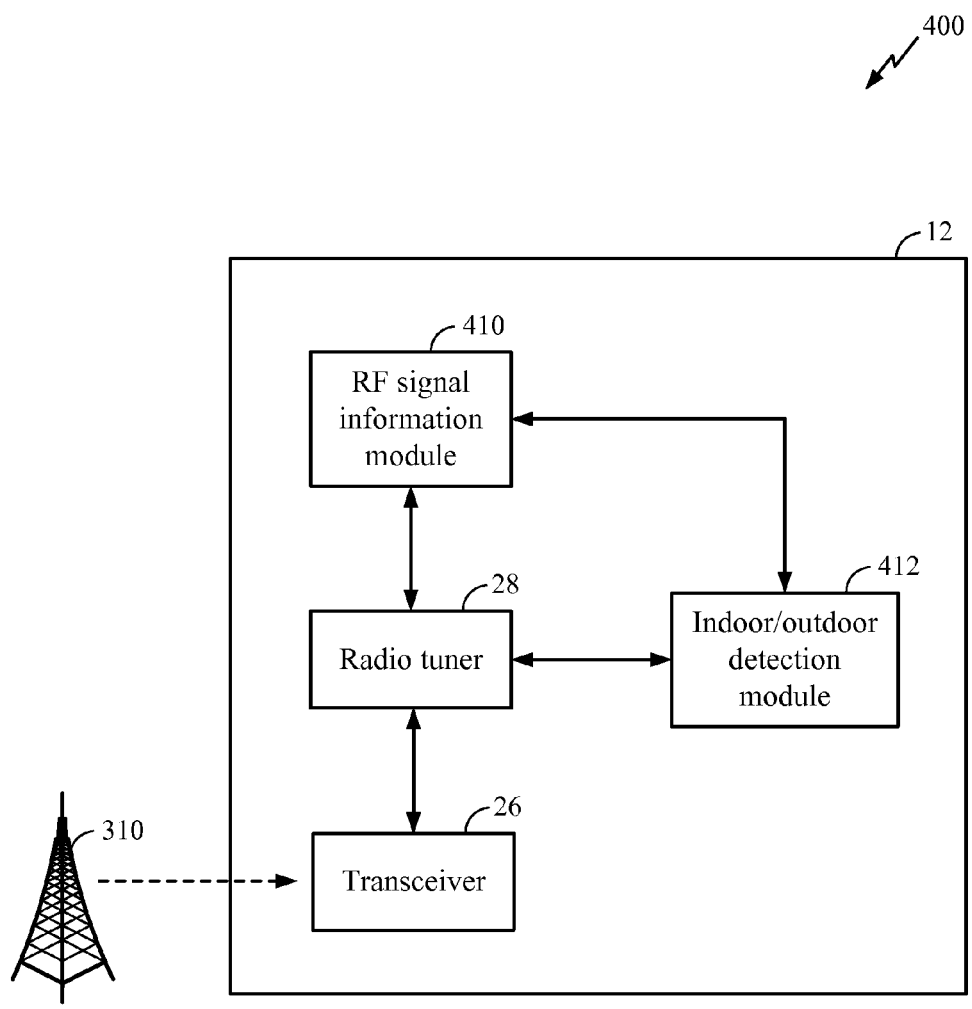
FIG. 4 is a block diagram of a system for conducting indoor/outdoor detection at a mobile device as shown in FIG. 1.

As a result of the distinctive attenuation characteristics of radio broadcast signals as described above, the mobile device 12 can perform indoor/outdoor detection (classification) using ambient radio broadcast signals. Turning next to FIG. 4, a system 400 for performing indoor/outdoor detection in this manner includes an RF signal information module 410 and an indoor/outdoor detection module 412. Here, the system 400 is implemented by the mobile device 12, but some or all functionality of the system 400 could be implemented by entities distinct from and communicatively coupled to the mobile device 12 (e.g., via the transceiver 26 of the mobile device 12), such as a cloud service, another mobile device or other computing device, etc. Further, the modules 410, 412 may be implemented in hardware, software, or a combination of hardware and software. For instance, the memory 22 may store processor-executable instructions (e.g., the software 24) which, when executed by the processor 20, cause the processor 20 to act as means for performing the functions of the modules 410, 412 described herein.

As noted above, radio broadcast signals exhibit distinctive characteristics based on whether the signals are observed indoors or outdoors. More particularly, a given radio broadcast signal observed at a given location will be relatively stronger if the location is outdoors and relatively weaker (or absent) if the location is indoors, e.g., inside a structure such as the structure 320. Accordingly, the indoor/outdoor detection module 412 measures one or more signals (e.g., corresponding to one or more available radio channels) received by the transceiver 26 and/or radio tuner 28 from respective ones of the radio towers 310 and/or other sources. These measurements may include received signal strength indication (RSSI) measurements, signal-to-noise ratio (SNR) measurements, and/or other measurements that may be used to quantify the strength or other properties of the received signals. Further, these measurements may be conducted periodically, e.g., at scheduled intervals of a given length, or measurements may be triggered by one or more conditions, such as movement of the mobile device 12; changes to properties of detected signals; detection of new signals or failure to detect previously-detected signals (e.g., as may be the case when the mobile device enters or leaves the coverage area of a signal source, respectively), etc. Measurements may be taken at the mobile device 12 for a determined subset of radio frequencies corresponding to radio channels known to be available in the area of the mobile device 12. Various techniques for selecting radio channels to be measured are described in further detail below. Alternatively, the mobile device 12 may scan some or all of the radio spectrum to obtain measurements.

Once signal strength measurements have been obtained for one or more broadcast radio signals, the indoor/outdoor detection module 412 utilizes the computed signal strengths to determine whether the mobile device 12 is located indoors (i.e., inside a building or other structure) or outdoors. In general, the indoor/outdoor detection module 412 obtains information, from the RF signal information module 410 or other components of the mobile device 12 or one or more remote network devices, relating to reference outdoor signal strengths for respective radio channels in an area corresponding to a coarse location estimate of the mobile device 12. These reference signal strengths may also be referred to as threshold signal strengths, baseline signal strengths, expected signal strengths, and/or by any other nomenclature. Further, the coarse location estimate of the mobile device 12 at this stage can be a relatively imprecise estimate, e.g., a city or ZIP code in which the mobile device 12 is estimated to be located, identities of one or more cellular base stations near the mobile device 12, etc.

Once measured and reference signal strengths have been obtained for one or more radio channels, the indoor/outdoor detection module 412 compares the measured signal strengths for selected radio channels to the reference strengths and produces an indoor/outdoor classification for the mobile device 12 based at least in part on the difference, if any, between the measured and reference signal strengths for the respective channels. As noted above, a radio broadcast signal is measurably attenuated when penetrating building walls or other obstructions but otherwise decays relatively slowly over large distances. Thus, the indoor/outdoor detection module 412 may classify the mobile device 12 as indoors if a measured strength of a given radio broadcast signal is less than the reference strength for said signal, or as outdoors otherwise. Alternatively, a probability-based approach may be utilized, in which a larger difference between the measured and reference signal strengths for a given radio broadcast signal indicates an increased probability that the mobile device 12 is indoors, and a smaller difference indicates an increased probability that the mobile device 12 is outdoors. The probability may be obtained, e.g., by modeling the strength of a given radio signal as a Gaussian distribution having a mean set to the average outdoor signal strength for the signal and obtaining the probability as a function of the number of standard deviations between the mean strength and a measured strength. Additionally, the simple comparison technique and/or the probability-based technique may be performed for multiple received radio/television broadcasts and combined to obtain a combined indoor/outdoor classification. These techniques are described in further detail below.

The reference signal strengths for the radio channels utilized by the indoor/outdoor detection module 412 are known and are stored at or otherwise obtainable by the RF signal information module 410 prior to indoor/outdoor detection. For instance, the reference signal strengths may be stored at a local database or other data store, or alternatively the reference signal strengths may be downloaded and/or otherwise obtained from an external entity (e.g., a server, etc.) via a wired or wireless communication link. Accordingly, the mobile device 12 can compute an indoor/outdoor classification based on the strength of a single sampling of one or more radio channels relative to their corresponding references, which results in improved speed and efficiency as compared to techniques that rely upon changes in the strength of a signal over time. Information pertaining to the radio channels to be measured by the indoor/outdoor detection module 412 may be obtained using a variety of techniques. Two such techniques are discussed in the description below and illustrated by FIGS. 5-6, although other techniques are possible. Further, while a reference signal strength for a given radio channel may be assumed to be constant within a geographical area for simplicity, one or more techniques, such as crowdsourcing as described below and/or other techniques, could be utilized to correct and/or adjust reference signal strengths within a geographical area based on various conditions.

Figure 5:
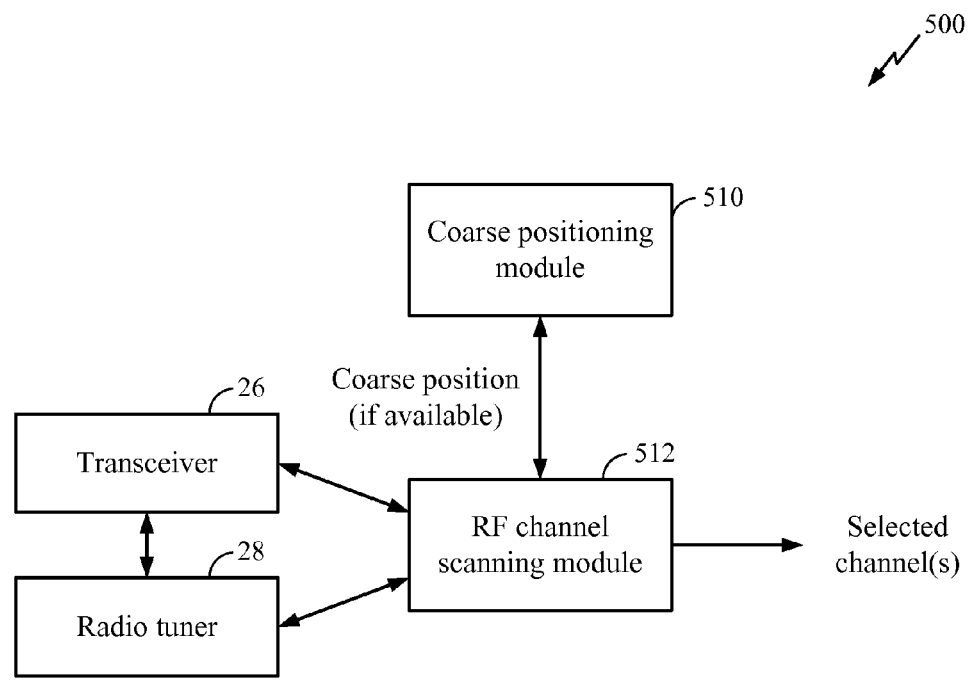
FIG. 5 is a block diagram of a system for selecting radio frequency (RF) broadcast channels for indoor/outdoor detection based on an estimated coarse position.

FIG. 5 illustrates a system 500 for obtaining information pertaining to available radio channels in a given area using location-aided scanning. The system 500 includes a coarse positioning module 510 and a radio channel scanning module 512, which are configured to determine a coarse position estimate for the mobile device 12 and select available radio channels at the coarse position of the mobile device 12 for indoor/outdoor classification.

The coarse positioning module 510 may determine a position estimate for the mobile device 12 in any manner that produces a position estimate with sufficient precision to enable the position of the mobile device 12 to be associated with a set of available radio channels and corresponding reference signal strengths. For instance, a position estimate for the mobile device 12 may be determined via trilateration of cellular signals from respective ones of the base stations 14 and/or radio broadcast signals from respective ones of the radio towers 310. As another example, the coarse positioning module 510 may set a position estimate of the mobile device 12 to be equal to a coverage area of a nearby one of the base stations 14 or other transmitters, e.g., based on Cell-ID positioning or other methods known in the art. Also or alternatively, the coarse positioning module 510 may instruct the radio channel scanning module 512 to conduct a partial or complete scan of the radio spectrum at a given location and determine the coarse position estimate based on information associated with successfully detected radio broadcast signals, such as Radio Data System (RDS) or Radio Broadcast Data System (RBDS) information embedded in FM radio broadcast signals. The coarse positioning module 510 may obtain a position estimate for the mobile device 12 based on this embedded information either directly (e.g., if the embedded information includes location information) or indirectly (e.g., by obtaining station or channel identification information from the embedded information and accessing a database or other list of licensed radio channels to obtain a location for the identified channel). As still another alternative, the coarse positioning module 510 may not compute the coarse position estimate but instead obtain it from a cloud server or another computing device, from user input (e.g., a user may be prompted to enter the current city or ZIP code), from a default or "home" position, etc. Other techniques could also be used.

Based on a coarse position of the mobile device 12 as reported by the coarse positioning module 510, the radio channel scanning module 512 obtains channel frequencies, expected or baseline outdoor signal strengths, and/or information relating to one or more detectable (available) radio channels at the coarse position. The radio channel scanning module 512 may obtain this information independently, or it may operate in combination with other components of the mobile device, such as the RF signal information module 410 shown in FIG. 4, the processor 20 and/or software components implemented by the processor 20, or any other hardware or software elements.

The radio channel scanning module 512 may obtain a list of detectable radio channels for a given coarse position based on a previously generated list of radio channels, e.g., a record of licensed radio channels in an associated radio/television market that is created and maintained by a government licensing authority (e.g., the U.S. Federal Communications Commission (FCC) or similar licensing bodies in other countries) and/or private entities. Also or alternatively, identities of available radio channels in the area of the mobile device 12 may be obtained by the radio channel scanning module 512 in the process of determining the coarse position of the mobile device 12. In the event that more channels are available in a given area than are used by the indoor/outdoor detection module 412, the radio channel scanning module 512 may select from the available channels, e.g., by obtaining signal strength measurements from the available channels and selecting the channels having the strongest signals, or by any other means that result in a reduced list of selected channels.

Reference outdoor signal strengths for the selected radio channels may be obtained by the indoor/outdoor detection module 412 from known and pre-generated information relating to the selected channels. For instance, if available radio channels in the area of the mobile device 12 are identified using a listing of licensed radio stations as described above, the baseline outdoor signal strengths may also be obtained from this listing either directly or indirectly (i.e., based on other information in the listing). If a listing provides a transmission power for a particular radio channel and the radio channel is known to transmit substantially constantly at this transmission power, the expected outdoor signal strength for the channel may be determined by adjusting the channel strength to account for the distance between the coarse position of the mobile device 12 and the source (e.g., the radio tower 310) of the radio channel using signal propagation models generally known in the art.

As radio signals decay slowly over large distances, the observed signal strength for a given radio signal may be assumed to change only negligibly within a geographical region of limited area, such as an area corresponding to a ZIP code. As a result, all locations within a given ZIP code or other such region may be associated with the same baseline signal strength for a given radio channel.

Also or alternatively, information regarding available radio channels in an area and expected outdoor signal strengths for the channels may be cached or otherwise pre-stored by the mobile device 12 (e.g., at the memory 22) and retrieved as needed. For instance, the mobile device 12 may maintain cached channel lists or profiles for frequently-visited locations (e.g., home, office, school, etc.). The mobile device 12 may also maintain cached channel profiles corresponding to major metropolitan areas or other similar regions. Once generated, these cached lists may be updated periodically or upon triggering of one or more update conditions (e.g., addition or removal of a radio channel from the area, changes in transmission power parameters, etc.). Information regarding available radio channels may also be obtained via crowdsourcing, as will be described below. In any case, the radio channels selected for processing by the system 500 and their corresponding reference signal strengths and/or other related information are subsequently provided to the indoor/outdoor detection module 412 and/or the RF signal information module 410 to facilitate in conducting and/or managing indoor/outdoor classifications for the mobile device 12.

Figure 6:
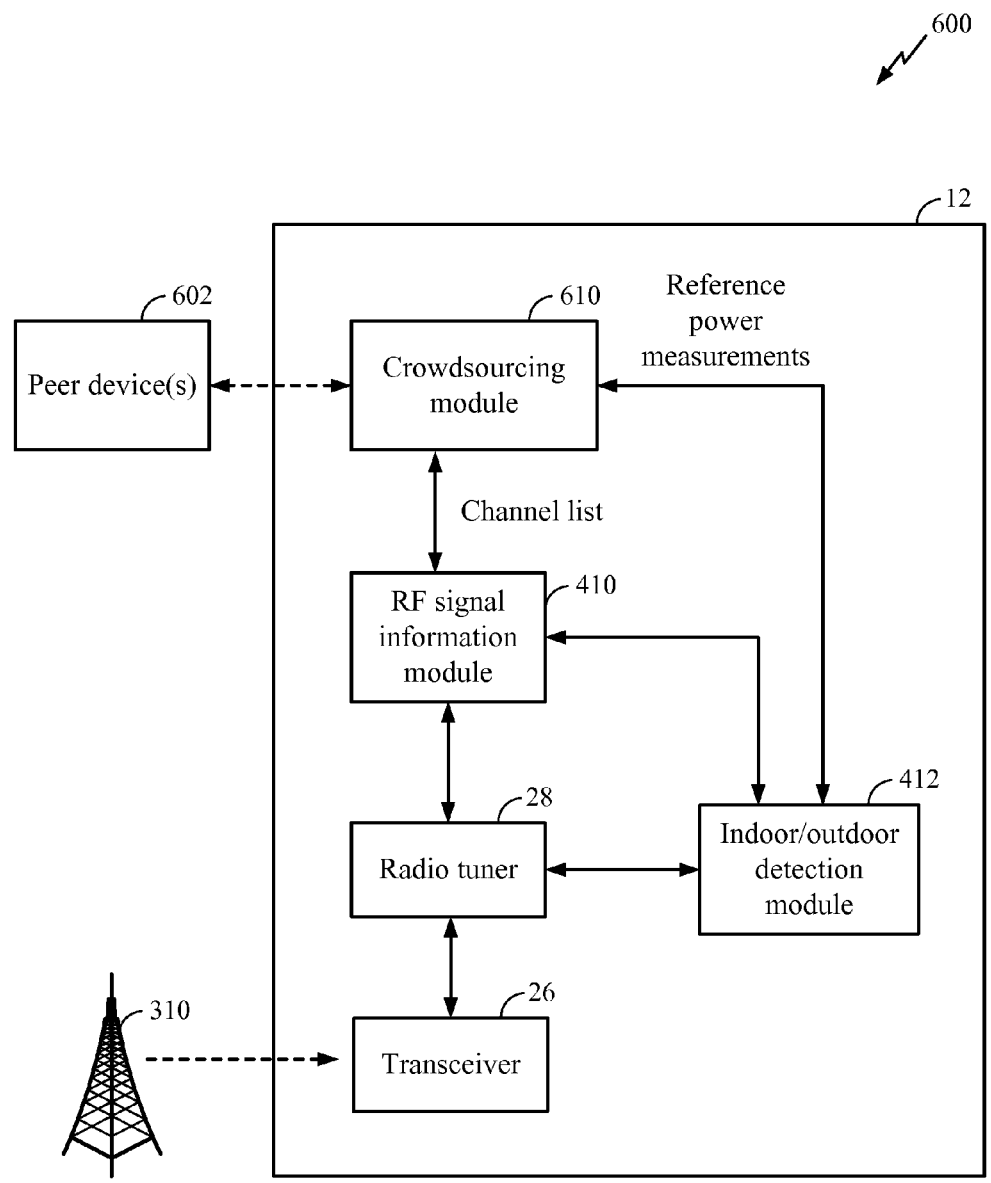
FIG. 6 is a block diagram of a system for obtaining and utilizing crowdsourced RF broadcast channel information for indoor/outdoor detection.

Turning next to FIG. 6, a system 600 for obtaining information pertaining to available radio channels via crowdsourcing includes the mobile device 12 as shown in FIG. 4 with an additional crowdsourcing module 610 implemented by the mobile device 12. Similar to the other components of the mobile device 12, the crowdsourcing module 610 may be implemented in hardware, in software (e.g., via software 24 stored on the memory 22 and executed by the processor 20), or a combination of hardware and software. Further, while the crowdsourcing module 610 is illustrated in FIG. 6 as a separate block, some or all of the functionality of the crowdsourcing module 610 may be implemented by other parts of the mobile device 12, such as the transceiver 26.

The crowdsourcing module 610 is configured to communicate with one or more peer devices within range of the mobile device 12, here a peer device 602, via one or more wired or wireless communication technologies either currently known in the art or developed in the future. The crowdsourcing module 610 may be part of a more generalized peer-to-peer (P2P) communication subsystem of the mobile device 12, or it may be a specialized module for obtaining radio channel information utilized by the RF signal information module 410 and/or the indoor/outdoor detection module 412. As another alternative, the crowdsourcing module 610 may be implemented at least in part by the transceiver 26. In any implementation, the communication technologies utilized by the crowdsourcing module 610 may be the same as, or different from, the communication technologies utilized by the transceiver 26 for communication with entities other than the peer device 602. In some implementations the peer device 602 is a remote mobile device with similar functionality to the mobile device 12; however, the peer device 602 may be any suitable device within the system 600, such as a mobile device, a specialized information source device or other network node, an access point, one of the BTSs 14, etc.

The crowdsourcing module 610 is configured to communicate with the peer device 602 to obtain information relating to available radio channels in the area of the mobile device 12 and information relating to such channels, such as signal strength and/or other measurements. The crowdsourcing module 610 may obtain radio channel information for processing by the RF signal information module 410 and/or the indoor/outdoor detection module 412 as needed, or alternatively the crowdsourcing module 610 may obtain information in advance of an indoor/outdoor classification (e.g., periodically, upon device startup or initial configuration, upon detecting a greater-than-threshold change in location, etc.) and facilitate the storing of such information for future use. The crowdsourcing module 610 may also obtain the coarse position of the mobile device 12 in a similar manner to the coarse positioning module 510 shown in FIG. 5, although determination of a coarse position of the mobile device 12 may be omitted in the crowdsourcing case.

Information obtained by the crowdsourcing module 610 from a peer device 602 includes identities of one or more radio channels that are detectable by the peer device 602 and signal strengths for these channels as measured by the peer device 602. In some cases, the peer device 602 may provide additional information, such as the position of the peer device 602 (e.g., given as GPS coordinates or the like) and/or whether the peer device 602 itself has been determined to be inside or outside. If additional information is given, the indoor/outdoor detection module 412 may adjust the reference power levels for respective radio channels for which additional information is given. In general, however, the indoor/outdoor detection module 412 is operable to perform an indoor/outdoor classification for the mobile device 12 based on simple signal measurement data, and the precision of such a classification may be improved with additional information and/or measurement sources.

As another alternative, the crowdsourcing module 610 may be configured to collect data only from devices that are found to have valid (recent) satellite positioning coordinates available. As such devices have a known position, e.g., within an area defined by a precision of the satellite positioning coordinates and a factor accounting for potential movement of the device since the time the coordinates were obtained, the RF signal information module 410 and/or the indoor/outdoor detection module 412 may account for device positions in classifying the indoor/outdoor state of the mobile device 12. Further, as devices with satellite positioning enabled are more likely to be outdoors than indoors, measurements for peer devices whose indoor/outdoor states are unknown can be either assumed to be outdoor measurements or weighted in favor of being outdoor measurements.

Based on the information received by the crowdsourcing module 610, the RF signal information module 410 may set and/or adjust reference or threshold power levels for respective radio channels as a function of peer-reported power levels. For instance, the RF signal information module 410 can instruct the indoor/outdoor detection module 412 to consider the mobile device 12 to be outdoors if a measured signal power level for a given radio channel is no less than a signal power level of the same radio channel measured by a peer device known to be outdoors (optionally adjusted by a tolerance parameter). Similar operations could be performed for signal measurements provided by peer devices known to be indoors.

While the above operations of the crowdsourcing module 610 are specific to indoor/outdoor detection using peer measurements of radio signals, the crowdsourcing module 610 may be operable to perform further operations in addition to, or in place of, those described above. For instance, the crowdsourcing module 610 could be implemented as an extension of a social radio application, in which a user of a device is given the ability to share information relating to a radio station to which the user is currently listening and/or other information, such as current song name or the like. Other applications could also be extended to implement the functionality of the crowdsourcing module 610 as described above.

Returning to FIG. 4, the indoor/outdoor detection module 412 computes an indoor/outdoor classification for the mobile device 12 by obtaining data relating to strengths of one or more radio signals as measured by the transceiver 26 and radio tuner 28, comparing these measured strengths to one or more reference strengths, and using this comparison to produce an indoor/outdoor decision. The indoor/outdoor decision may be a "hard" decision, such as a discrete (e.g., 1-bit) value simply indicating whether the mobile device 12 is estimated to be indoors or outdoors. Alternatively, the indoor/outdoor detection module 412 may produce a "soft" decision, such as a probability that the mobile device 12 is located indoors or outdoors.

Figure 7:
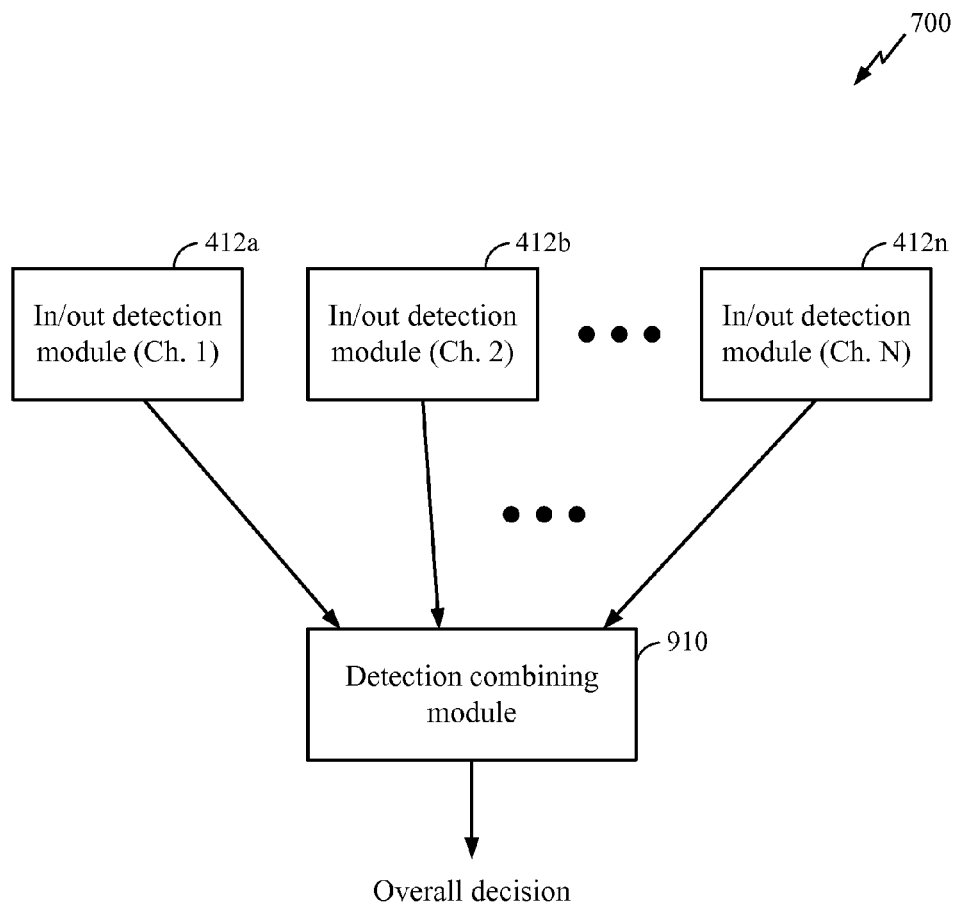
FIG. 7 is a functional block diagram of a system for performing indoor/outdoor detection using a plurality of radio channels.

The indoor/outdoor detection module 412 may classify the indoor/outdoor state of the mobile device 12 using data from one radio channel or multiple radio channels. One technique for utilizing data from multiple radio channels is shown by system 700 in FIG. 7. The system 700 includes multiple functional blocks, here n blocks 412a-412n, which implement the functionality of the indoor/outdoor (in/out) detection module 412 as described above. As shown, each of the functional blocks 412a-412n of the indoor/outdoor detection module 412 analyze and operate upon signals received from an assigned radio channel. While FIG. 7 illustrates an indoor/outdoor detection module having a one-to-one mapping between radio channels and functional blocks 412a-412n, other mappings, such as many-to-one and/or one-to-many mappings, could be used.

Each of the functional blocks 412a-412n produce an indoor/outdoor decision for the radio channel(s) to which they are assigned. As noted above, the decision may be a hard decision or a soft decision. The results from each of the functional blocks 412a-412n are then passed to a decision combining module 710, which combines the individual block decisions to obtain an overall decision for the mobile device 12.

The decision combining module 710 may operate in any way suitable for converting a plurality of intermediate decisions into an overall decision. For instance, the decision combining module 710 may act as an arbitration mechanism which receives hard decisions from each of the functional blocks 412a-412n and assigns as a classification result an intermediate result that is provided by at least x of the functional blocks 412a-412n, where x is an integer greater than half of the total number of functional blocks 412a-412n. If the results given by the functional blocks 412a-412n are inconclusive, i.e., a common result was not returned by at least x of the functional blocks 412a-412n, the decision combining module 710 may direct new measurements and/or individual channel classifications.

As another example, if the functional blocks 412a-412n are configured to provide classification results to the decision combining module 710 as probabilities, the decision combining module 710 can compute an overall decision for the mobile device 12 as a combination of these intermediate classification results. The combination may be a weighted combination, with weighting factors applied to respective intermediate results as a function of precision and/or confidence indicators for the intermediate results, approximate distances from sources of the respective radio channels to the mobile device 12, an amount of time since the measurements on which the intermediate results are based were taken, etc. The decision combining module 710 may provide the overall decision as a probability (e.g., the combined probability itself or a function of the combined probability), or a hard decision (e.g., by converting the computed overall probability into a discrete indoor/outdoor state).

FIG. 7 illustrates one technique for performing indoor/outdoor classification based on data relating to multiple radio channels. Other techniques could be used. For instance, the indoor/outdoor detection module 412 may be configured to perform analysis of multiple radio channels and obtain an overall indoor/outdoor classification in an integrated manner. As an example, the indoor/outdoor detection module 412 can generate or otherwise obtain a reference vector that includes reference outdoor signal strength data for a set of radio channels being analyzed and a measurement vector that includes actual measured signal strengths (e.g., as measured by the transceiver 26 and/or radio tuner 28) for the respective radio channels. The indoor/outdoor detection module 412 can then compute the distance between the reference and measurement vectors. If the distance between the vectors is less than a defined tolerance, the mobile device 12 is determined to be outdoors, or indoors otherwise. Similarly, the reference vector could instead include reference indoor signal strengths, which could be similarly processed by the indoor/outdoor detection module 412.

The above-described vector-based approach may also be used to supplement other indoor/outdoor classification mechanisms. For instance, a vector may be constructed as described above for a set of radio signal measurements that are associated with an indoor/outdoor classification. This vector is then compared to a baseline or expected vector for that classification (i.e., a baseline indoor vector or a baseline outdoor vector), and a confidence for the classification can be obtained as a function of the distance between the actual and baseline vectors.

Figure 8:
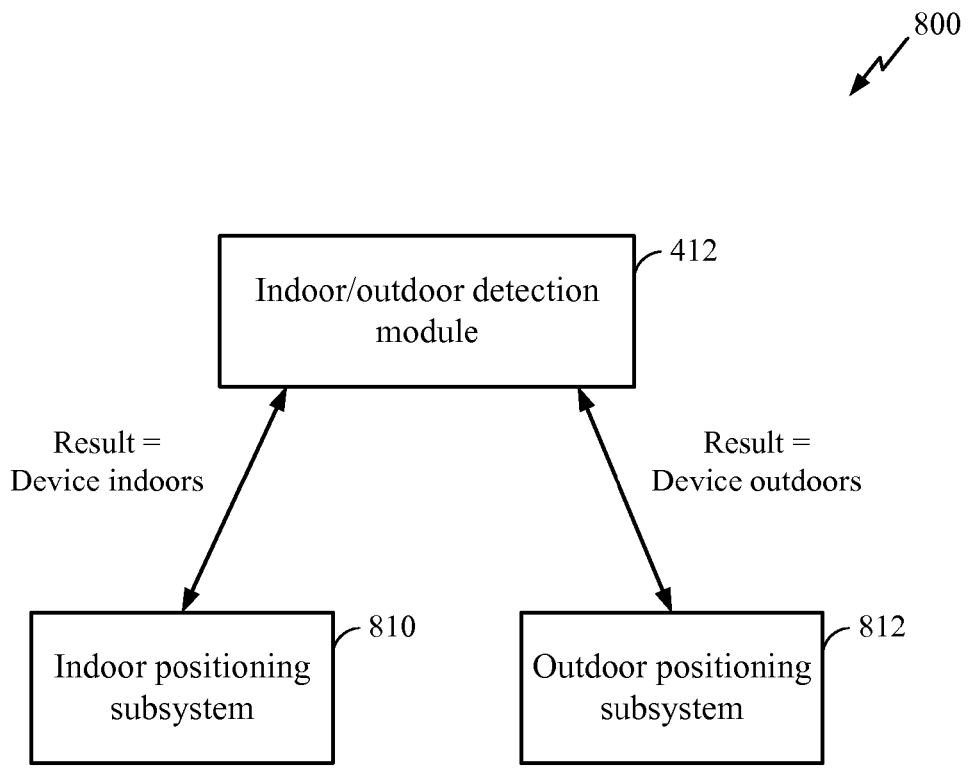
FIG. 8 is a functional block diagram of one embodiment of a mobile positioning system that utilizes indoor/outdoor detection.

As a result of the indoor/outdoor classification performed as described above, the mobile device 12 may be configured to perform different actions based on whether the mobile device 12 is determined to be indoors or outdoors. For instance, FIG. 8 illustrates a system 800 that utilizes a classification provided by the indoor/outdoor detection module 412 to manage positioning operations at the mobile device 12. Here, an indoor positioning subsystem 810 is activated if the mobile device 12 is determined to be indoors, and an outdoor positioning subsystem 812 is activated if the mobile device 12 is determined to be outdoors. The indoor positioning subsystem 810 responds to being activated by enabling indoor positioning operations (e.g., positioning based on measurements for signals obtained from Wi-Fi access points or other transmitters associated with an indoor region, etc.); acquiring assistance data (if needed) for such operations, which may include map data for relevant indoor regions (e.g., buildings or floors or other sections of a building), transmitter information for relevant indoor regions, etc.; and/or disabling satellite-based positioning. Conversely, the outdoor positioning subsystem 812 responds to being activated by disabling indoor positioning, enabling satellite-based positioning, and obtaining satellite acquisition assistance data if needed. Additional or different operations may also be performed by the subsystems 810, 812.

In addition to positioning configuration, the indoor/outdoor detection module 412 may be utilized to manage any operational characteristics of the mobile device 12 which may be desirably configured based on whether the mobile device 12 is located indoors or outdoors. These characteristics could include application profiles, voice control settings, volume or display settings, etc. The indoor/outdoor detection module 412 can also facilitate automatic execution of various applications or other software routines on the mobile device 12 upon detecting a given indoor/outdoor status. Other operations could also be performed.

Figure 9:
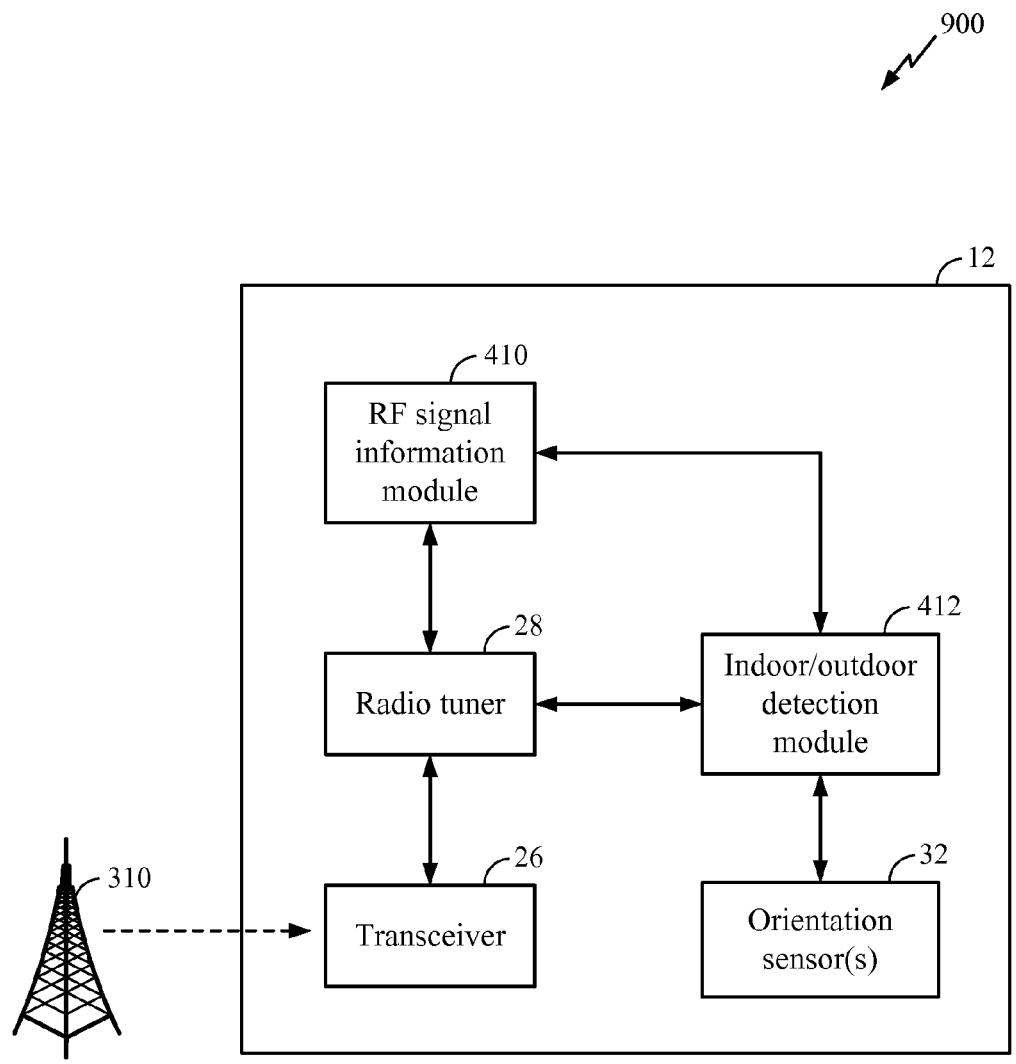
FIG. 9 is a block diagram of a system for triggering indoor/outdoor detection based on detected device movement.

Upon completion of an indoor/outdoor classification, operation of the indoor/outdoor detection module 412 may be suspended (paused) in order to conserve power consumption and/or other resources of the mobile device 12. The indoor/outdoor detection module 412 may subsequently be re-activated upon the fulfilment of one or more activation conditions. For instance, system 900 in FIG. 9 illustrates that one or more of the orientation sensors 32 can be utilized to re-activate the indoor/outdoor detection module if the orientation sensors 32 indicate that the mobile device 12 has moved more than a threshold amount. Conversely, if the mobile device 12 has not moved at least the threshold amount, the indoor/outdoor detection module 412 remains paused and a previous indoor/outdoor classification, e.g., the most recent valid classification, is used. While FIG. 9 illustrates movement measured by the orientation sensors 32, other techniques for detecting movement of the mobile device 12, such as satellite positioning, trilateration of wireless signals, etc., could also be used. Also or alternatively, the functionality of the indoor/outdoor detection module 412 can be paused or resumed based on any other suitable conditions, such as powering the mobile device 12 on or off, registration of the mobile device 12 to a wireless network, periodically at time periods of a fixed or variable interval, etc.

Figure 10:
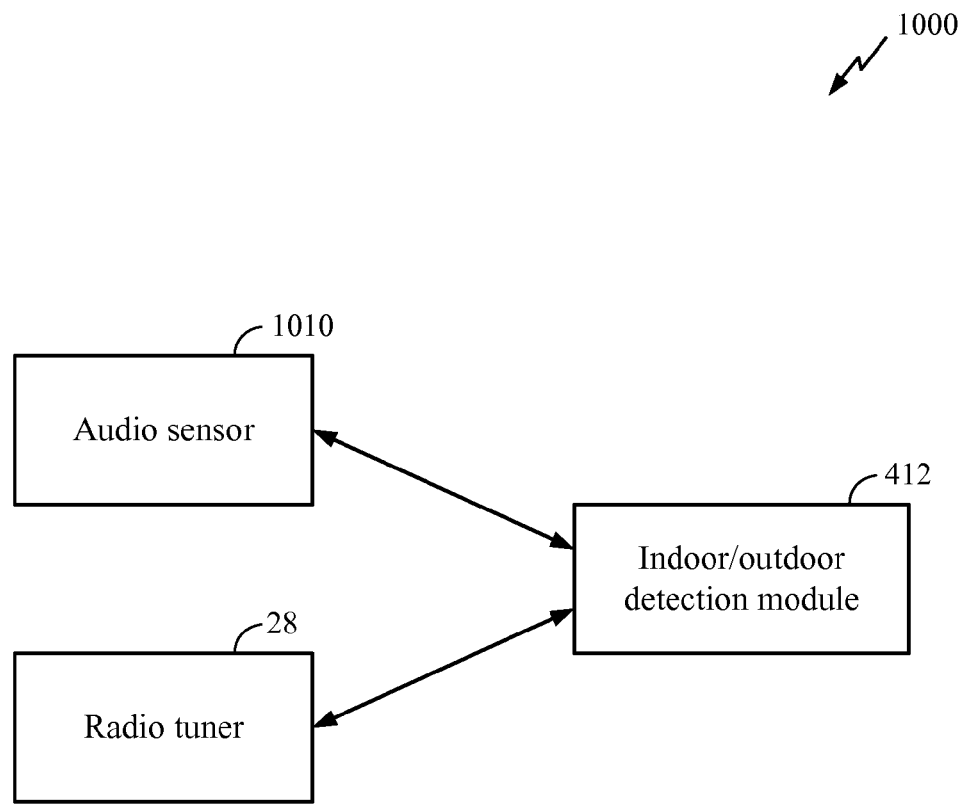
FIG. 10 is a block diagram of a system for performing indoor/outdoor detection using ambient audio in addition to radio broadcast transmissions.

The indoor/outdoor detection module 412 may utilize data from additional sources to supplement radio signal strength data obtained via the radio tuner 28 (and/or the transceiver 26). For instance, system 1000 in FIG. 10 illustrates the indoor/outdoor detection module 412 performing indoor/outdoor classification for the mobile device 12 based on a combination of radio signal measurements as described above and ambient audio information obtained via an audio sensor 1010. The audio sensor 1010 may include one or more microphones and/or other devices operable to capture audio in an area of the mobile device 12. The audio sensor 1010 may capture samples of audio at a preset sample rate (e.g., between approximately 8 kHz and approximately 44 kHz, etc.), or alternatively the audio sensor may operate asynchronously or continuously.

The ambient audio information provided by the audio sensor 1010 to the indoor/outdoor detection module 412 relates to properties of the ambient audio including, e.g., loudness, tones, and fluctuation. The indoor/outdoor detection module can analyze this information to extract sound features, which are in turn used to classify whether a detected sound corresponds to an indoor or outdoor environment. This classification may then be used in combination with radio signal measurements as described above to infer whether the mobile device 12 is indoors or outdoors.

In general, ambient noise levels in outdoor areas are louder than those of indoor areas because of acoustic and thermal insulation applied to indoor areas such as offices. If captured audio has additional features to the ambient noise, such as music or speech, the indoor/outdoor detection module 412 may attempt to cancel or otherwise remove these features from the audio stream in order to isolate the ambient noise.

Additionally, the indoor/outdoor detection module 412 may attempt to detect sound signatures indicative of an indoor or outdoor environment. For instance, tonal noise is commonly produced by various objects within indoor areas, such as heating, ventilation and air-conditioning (HVAC) systems in buildings. For instance, motors and fans may emit low-frequency pure tones under 350 Hz. As another example, chillers can produce higher frequency tones. Additionally, indoor environments commonly produce a 50-60 Hz "hum" due to the electric grid. Likewise, sound signatures indicative of outdoor areas, such as sound caused by wind, may also be detected.

Figure 11:
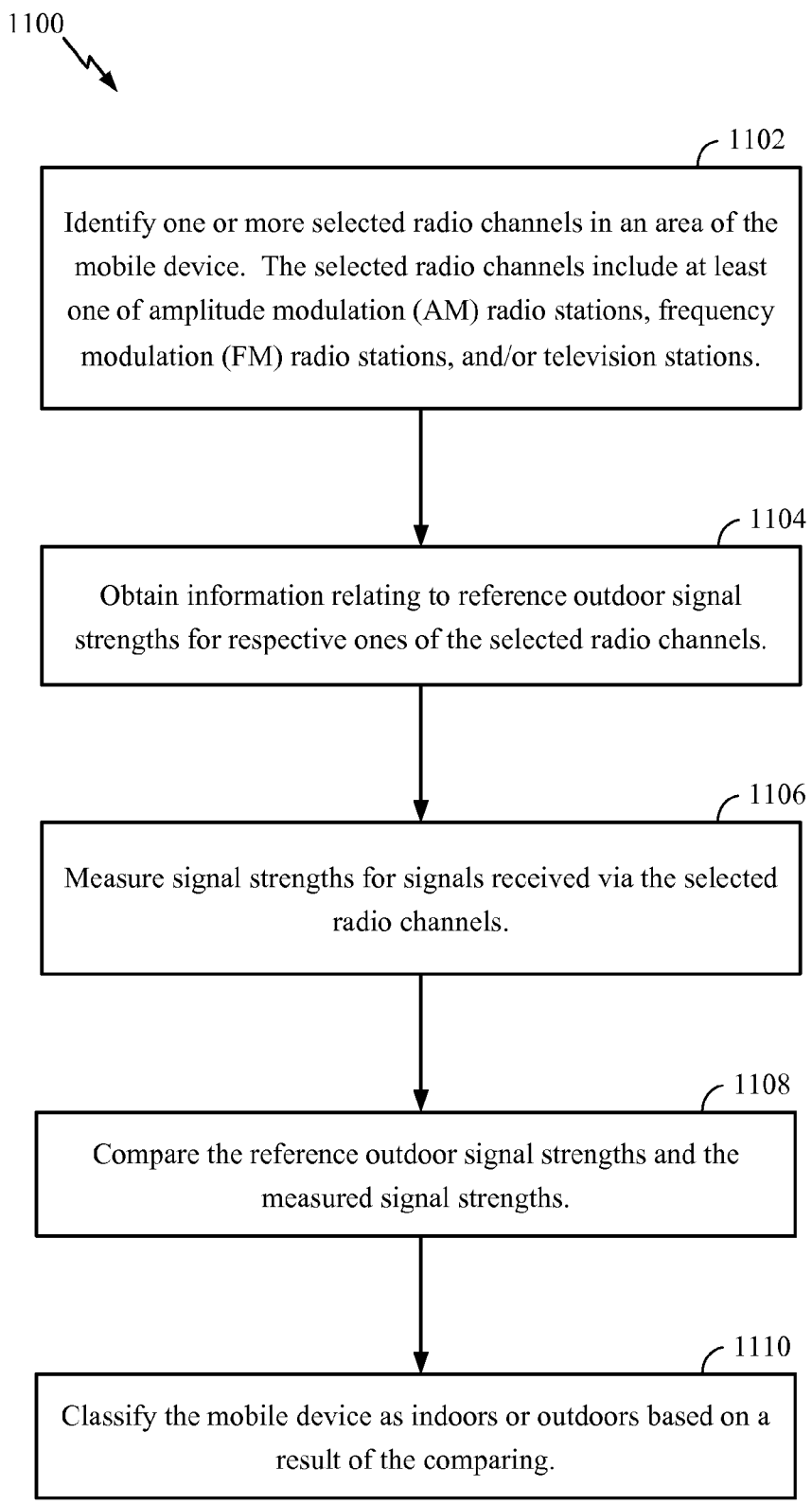
FIGS. 11-12 are block flow diagrams of respective processes for determining whether a mobile device is indoors or outdoors.

Referring to FIG. 11, with further reference to FIGS. 1-10, a process 1100 of performing indoor/outdoor detection for a mobile device, such as the mobile device 12, includes the stages shown. The process 1100 is, however, an example only and not limiting. The process 1100 can be altered, e.g., by having stages added, removed, rearranged, combined, and/or performed concurrently. Still other alterations to the process 1100 as shown and described are possible.

At stage 1102, one or more selected radio channels in an area of the mobile device 12 are identified, e.g., by a RF signal information module 410 of the mobile device 12, which may be implemented via software 24 stored on the memory 22 of the mobile device 12 and executed by the processor 20 of the mobile device 12, one or more hardware components, or a combination of hardware and software. Here, the selected radio channels include at least one of AM radio stations, FM radio stations, or television stations, although other or alternative channels could be used. The selected radio channels may be determined at stage 1102 based on a coarse position of the mobile device, e.g., as provided by the coarse positioning module 510 as described above with respect to FIG. 5, by one or more peer devices as provided by the crowdsourcing module 610 as described above with respect to FIG. 6, and/or by other suitable means.

At stage 1104, information relating to reference outdoor signal strengths for respective radio channels selected at stage 1102 is obtained. Similar to the selection of the radio channels at stage 1102, the reference outdoor signal strengths for the selected channels may be obtained based on a coarse position of the mobile device 12, crowdsourcing, and/or other means.

At stage 1106, measured signal strengths are calculated for signals received via the selected radio channels. Here, signals are received from the selected radio channels at a transceiver 26 and/or a radio tuner 28 as described with respect to FIG. 4, and the measured signal strengths are obtained via the transceiver 26 and/or radio tuner 28 themselves or the indoor/outdoor detection module 412. The indoor/outdoor detection module 412 may, in turn, be implemented in software, hardware, or a combination of software and hardware.

At stage 1108, the reference outdoor signal strengths obtained at stage 1104 are compared, e.g., by the indoor/outdoor detection module 412, to the measured signal strengths calculated at stage 1106. Subsequently, at stage 1110, the mobile device 12 is classified as indoors or outdoors by the indoor/outdoor detection module 412 based on a result of the comparison performed at stage 1108. The classification may be given as a discrete indoor/outdoor state and/or in other forms, such as a probability that the mobile device 12 is indoors (or outdoors), as generally described above.

Figure 12:
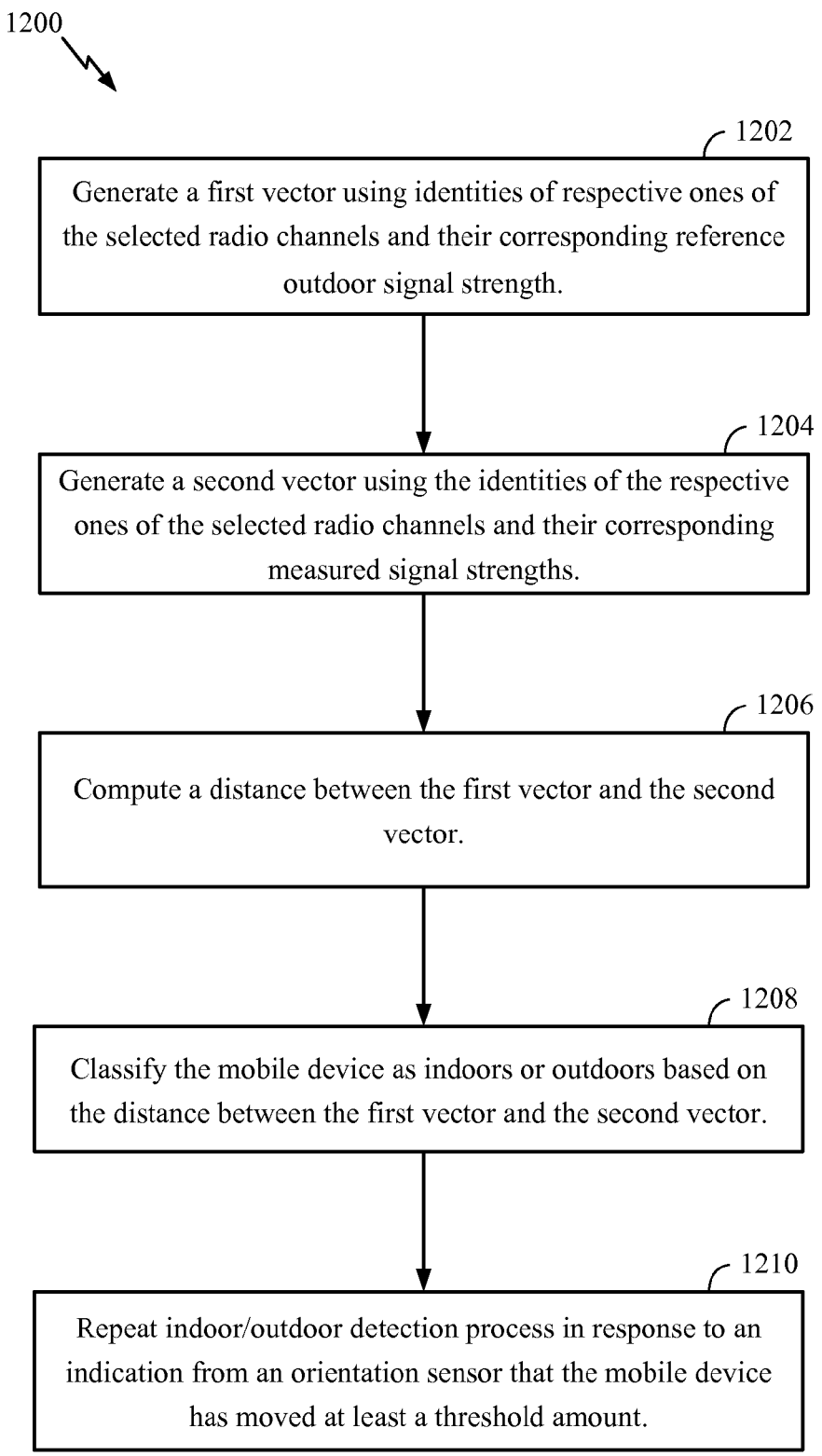

Referring next to FIG. 12, with further reference to FIGS. 1-10, another process 1200 of performing indoor/outdoor detection for a mobile device includes the stages shown. The process 1200 is, however, an example only and not limiting. The process 1200 can be altered, e.g., by having stages added, removed, rearranged, combined, and/or performed concurrently. Still other alterations to the process 1200 as shown and described are possible.

At stage 1202, a first vector is generated using identities of a plurality of radio channels, e.g., radio channels selected for use by the RF signal information module 410 and/or indoor/outdoor detection module 412, and their corresponding reference (indoor or outdoor) signal strengths.

Similarly, at stage 1204, a second vector is generated using the identities of the radio channels used at stage 1202 and their corresponding measured signal strengths, e.g., as obtained via the transceiver 26 or radio tuner 28 in combination with the indoor/outdoor detection module 412 or other modules.

At stage 1206, a distance between the first and second vectors generated at stages 1202 and 1204, respectively, is computed. The distance may be computed based on various metrics, such as a sum or average of the differences between the reference and measured signal strength levels for each of the selected channels, and may be weighted (to form a weighted sum or average) or unweighted. Other techniques could also be used.

At stage 1208, the mobile device 12 is classified as indoors or outdoors based at least in part on the distance computed at stage 1206. For instance, if the reference signal strengths correspond to outdoor signal strength, the mobile device 12 may be classified as outdoors if the sum (or average) of the differences between the reference and measured signal strengths for each selected radio channel is no greater than a reference level. Indoor reference levels may be processed similarly. As an alternative, classification at stage 1208 may include assigning a probability that the mobile device 12 is indoors or outdoors as a function of the distance between the first and second vectors.

Upon completion of stage 1208, an indoor/outdoor detection result is obtained for the mobile device 12. Subsequently, at stage 1210, it is determined whether a threshold amount of movement of the mobile device 12 has been detected, e.g., by an orientation sensor 32 of the mobile device. If such movement has not been detected, the process 1200 holds at 1210 for a future determination. Otherwise, the process 1200 returns to stage 1202 to repeat the indoor/outdoor detection.

The operations described above with respect to the process 1200 may be performed by a mobile device for which the indoor/outdoor detection is being performed, e.g., the mobile device 12, and/or a remote device. Further, the above described operations may be performed by software modules, such as the indoor/outdoor detection module 412 as implemented via the processor 20 executing instructions stored on the memory 22, as hardware modules, such as the orientation sensor 32, or as a combination of hardware and software. Other implementations are also possible.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for performing indoor/outdoor detection for a mobile device, the method comprising:
   identifying one or more selected radio channels in an area of the mobile device, wherein the selected radio channels comprise at least one of amplitude modulation (AM) radio stations, frequency modulation (FM) radio stations, or television stations;
   obtaining information relating to reference outdoor signal strengths for respective ones of the selected radio channels comprising the at least one of the amplitude modulation (AM) radio stations, the frequency modulation (FM) radio stations, or the television stations;
   measuring signal strengths for signals received via the selected radio channels;
   comparing the reference outdoor signal strengths and the measured signal strengths; and
   classifying the mobile device as indoors or outdoors based on a result of the comparing;
   wherein comparing the reference outdoor signal strength and the measured signal strength comprises:
      generating a first vector using identities of respective ones of the selected radio channels and their corresponding reference outdoor signal strengths;
      generating a second vector using the identities of the respective ones of the selected radio channels and their corresponding measured signal strengths; and
      computing a distance between the first vector and the second vector;
   and wherein classifying the mobile device as indoors or outdoors comprises:
      classifying the mobile device as indoors or outdoors based on the distance between the first vector and the second vector.

2. The method of claim 1, wherein classifying the mobile device further comprises classifying the mobile device as outdoors if the distance between the first vector and the second vector is less than a threshold distance.

3. The method of claim 1, wherein classifying the mobile device further comprises computing a probability that the mobile device is outdoors as a function of the distance between the first vector and the second vector.

4. The method of claim 1 further comprising obtaining a coarse position of the mobile device, wherein the identifying comprises identifying the selected radio channels based at least in part on the coarse position of the mobile device.

5. The method of claim 4 wherein the coarse position of the mobile device comprises at least one of a ZIP code in which the mobile device is located or an identity of a cellular base station within communication range of the mobile device.

6. The method of claim 4 wherein the identifying further comprises:
   accessing a listing of available radio channels based on the coarse position of the mobile device;
   identifying one or more available radio channels based on the listing; and
   selecting at least one of the available radio channels as the selected radio channels.

7. The method of claim 6 wherein the selecting comprises selecting one or more of the available radio channels based on relative signal strengths of the available radio channels.

8. The method of claim 1 further comprising obtaining at least one of identities of respective ones of the selected radio channels or the reference outdoor signal strengths for respective ones of the selected radio channels from a peer device.

9. The method of claim 1 wherein the classifying comprises computing a probability that the mobile device is outdoors based on the result of the comparing.

10. The method of claim 1 further comprising repeating the calculating, comparing and classifying in response to an indication from an orientation sensor that the mobile device has moved at least a threshold amount.

11. A mobile device including a processor and a memory operable in a wireless communication system, the mobile device comprising:
   a radio frequency (RF) signal information module configured to identify one or more selected radio channels in an area of the mobile device, wherein the selected radio channels comprise at least one of amplitude modulation (AM) radio stations, frequency modulation (FM) radio stations, or television stations, and to obtain information relating to reference outdoor signal strengths for respective ones of the selected radio channels comprising the at least one of the amplitude modulation (AM) radio stations, the frequency modulation (FM) radio stations, or the television stations;
   a transceiver configured to receive wireless signals;
   a radio tuner communicatively coupled to the transceiver and the RF signal information module and configured to identify, from the wireless signals received by the transceiver, signals received via the selected radio channels and to measure signal strengths for the signals received via the selected radio channels; and
   an indoor/outdoor detection module communicatively coupled to the RF signal information module and the radio tuner and configured to perform a comparison of the reference outdoor signal strengths and the measured signal strengths and to classify the mobile device as indoors or outdoors based on a result of the comparison;
   wherein the indoor/outdoor detection module configured to perform the comparison is configured to generate a first vector using identities of respective ones of the selected radio channels and their corresponding reference outdoor signal strengths, generate a second vector using the identities of the respective ones of the selected radio channels and their corresponding measured signal strengths, and compute a distance between the first vector and the second vector,
   and wherein the indoor/outdoor detection unit configured to classify the mobile device is configured to classify the mobile device as indoors or outdoors based on the distance between the first vector and the second vector.

12. The mobile device of claim 11, wherein the indoor/outdoor detection module is further configured to compute a probability that the mobile device is outdoors as a function of the distance between the first vector and the second vector.

13. The mobile device of claim 11 further comprising a coarse positioning module configured to obtain a coarse position of the mobile device, wherein the RF signal information module is further configured to identify the one or more selected radio channels based at least in part on the coarse position of the mobile device.

14. The mobile device of claim 13 wherein the RF signal information module is further configured to access a listing of available radio channels based on the coarse position of the mobile device, identify one or more available radio channels based on the listing, and select one or more of the available radio channels as the selected radio channels.

15. The mobile device of claim 11 further comprising a crowdsourcing module communicatively coupled to the RF signal information module and the indoor/outdoor detection module and configured to obtain at least one of identities of respective ones of the selected radio channels or the reference outdoor signal strengths for respective ones of the selected radio channels from a peer device.

16. The mobile device of claim 11 wherein the indoor/outdoor detection module is further configured to compute a probability that the mobile device is outdoors based on the result of the comparison.

17. The mobile device of claim 11 further comprising an orientation sensor communicatively coupled to the indoor/outdoor detection module and configured to provide information relating to movement of the mobile device to the indoor/outdoor detection module, wherein the indoor/outdoor detection module is further configured to repeat classification of the mobile device as indoors or outdoors in response to the orientation sensor indicating that the mobile device has moved at least a threshold amount.

18. An apparatus for performing indoor/outdoor detection, the apparatus comprising:
    a transceiver configured to receive wireless signals;
    a memory storing instructions; and
    a processor communicatively coupled to the transceiver and the memory and configured to execute the instructions stored by the memory, wherein the instructions, when executed by the processor, cause the processor to:
        identify one or more selected radio channels in an area of the apparatus, wherein the selected radio channels comprise at least one of amplitude modulation (AM) radio stations, frequency modulation (FM) radio stations, or television stations;
        obtain information relating to reference outdoor signal strengths for respective ones of the selected radio channels comprising the at least one of the amplitude modulation (AM) radio stations, the frequency modulation (FM) radio stations, or the television stations;
        identify, from the wireless signals received by the transceiver, signals received via the selected radio channels;
        measure signal strengths for the signals received via the selected radio channels; and
        classify the apparatus as indoors or outdoors at least in part by comparing the reference outdoor signal strengths and the measured signal strengths;
    wherein the instructions to cause the processor to classify the apparatus comprise one or more instructions to cause the processor to:
        generate a first vector using identities of respective ones of the selected radio channels and their corresponding reference outdoor signal strengths;
        generate a second vector using the identities of the respective ones of the selected radio channels and their corresponding measured signal strengths;
        compute a distance between the first vector and the second vector; and
        classify the apparatus as indoors or outdoors based on the distance between the first vector and the second vector.

19. The apparatus of claim 18 wherein the instructions, when executed by the processor, are further configured to cause the processor to:
    obtain a coarse position of the apparatus; and
    identify the one or more selected radio channels based at least in part on the coarse position of the apparatus.

20. The apparatus of claim 19 wherein the instructions, when executed by the processor, are further configured to cause the processor to:
    access a listing of available radio channels based on the coarse position of the apparatus;
    identify one or more available radio channels based on the listing; and
    select one or more of the available radio channels as the selected radio channels.

21. The apparatus of claim 18 wherein the instructions, when executed by the processor, are further configured to cause the processor to obtain at least one of identities of respective ones of the selected radio channels or the reference outdoor signal strengths for respective ones of the selected radio channels from a peer device.

22. The apparatus of claim 18 further comprising an orientation sensor configured to monitor movement of the apparatus, wherein the instructions, when executed by the processor, are further configured to cause the processor to repeat classification of the apparatus as indoors or outdoors in response to the orientation sensor indicating that the apparatus has moved at least a threshold amount.

23. A non-transitory processor-readable storage medium comprising processor-executable instructions configured to cause a processor to:
    identify one or more selected radio channels in an area of a mobile device, wherein the selected radio channels comprise at least one of amplitude modulation (AM) radio stations, frequency modulation (FM) radio stations, or television stations;
    obtain information relating to reference outdoor signal strengths for respective ones of the selected radio channels comprising the at least one of the amplitude modulation (AM) radio stations, the frequency modulation (FM) radio stations, or the television stations;
    measure signal strengths for signals received via the selected radio channels; and
    classify the mobile device as indoors or outdoors based at least on part on a comparison of the reference outdoor signal strengths and the measured signal strengths;
    wherein the instructions to cause the processor to classify the mobile device comprise one or more instructions to cause the processor to:
        generate a first vector using identities of respective ones of the selected radio channels and their corresponding reference outdoor signal strengths;
        generate a second vector using the identities of the respective ones of the selected radio channels and their corresponding measured signal strengths;
        compute a distance between the first vector and the second vector; and
        classify the apparatus as indoors or outdoors based on the distance between the first vector and the second vector.

24. The processor-readable storage medium of claim 23 further comprising instructions configured to cause the processor to:
    obtain a coarse position of the mobile device; and
    identify the one or more selected radio channels based at least in part on the coarse position of the mobile device.

25. The processor-readable storage medium of claim 23 further comprising instructions configured to cause the processor to obtain at least one of identities of respective ones of the selected radio channels or the reference outdoor signal strengths for respective ones of the selected radio channels from a peer device.

26. The processor-readable storage medium of claim 23 further comprising instructions configured to cause the processor to compute a probability that the mobile device is outdoors based on the comparison of the reference outdoor signal strengths and the measured signal strengths.

27. The processor-readable storage medium of claim 23 further comprising instructions configured to cause the processor to repeat classification of the mobile device as indoors or outdoors in response to an indication from an orientation sensor that the mobile device has moved at least a threshold amount.

* * * * *